United States Patent [19]
Kusters et al.

[11] 3,928,799
[45] Dec. 23, 1975

[54] AUTOMATIC BALANCING DC COMPARATOR VOLTMETER

[75] Inventors: Norbert L. Kusters; Malcolm P. MacMartin, both of Ottawa, Canada

[73] Assignee: Canadian Patents and Development Limited, Ottawa, Canada

[22] Filed: May 20, 1974

[21] Appl. No.: 471,482

[52] U.S. Cl............ 324/99 D; 324/98; 340/347 AD
[51] Int. Cl.² ........................................ G01R 17/06
[58] Field of Search........ 324/99 D, 98, 117 R, 100; 340/347 AD; 323/6

[56] References Cited
UNITED STATES PATENTS

| | | | |
|---|---|---|---|
| 3,079,598 | 2/1963 | Wald | 340/347 AD |
| 3,231,886 | 1/1966 | Slavin | 340/347 AD |
| 3,500,171 | 3/1970 | Kusters et al. | 323/6 |
| 3,564,534 | 2/1971 | Slavin | 324/99 D |

*Primary Examiner*—R. V. Rolinec
*Assistant Examiner*—Ernest F. Karlsen
*Attorney, Agent, or Firm*—Edward Rymek

[57] ABSTRACT

An apparatus for measuring potentials with great accuracy using a self-balancing current comparator. The comparator includes a variable primary winding and a secondary winding wound on a magnetic core. The primary is fed a constant current $I_2$ and the secondary is fed with a direct current such that ampere-turns balance is achieved between the windings. A resistor $R_1$, to which the unknown potential Vin is connected, is in turn connected to the secondary winding. An operational amplifier is connected to the junction between the resistor and the secondary winding. The output of the amplifier adjusts the turns in the primary winding and as a result when the potential across the amplifier is zero, the unknown voltage $V_{in} = R_1 \cdot N_2/N_3 \cdot I_2$ where $N_2$ and $N_3$ are the turns in the primary and secondary windings respectively.

13 Claims, 5 Drawing Figures

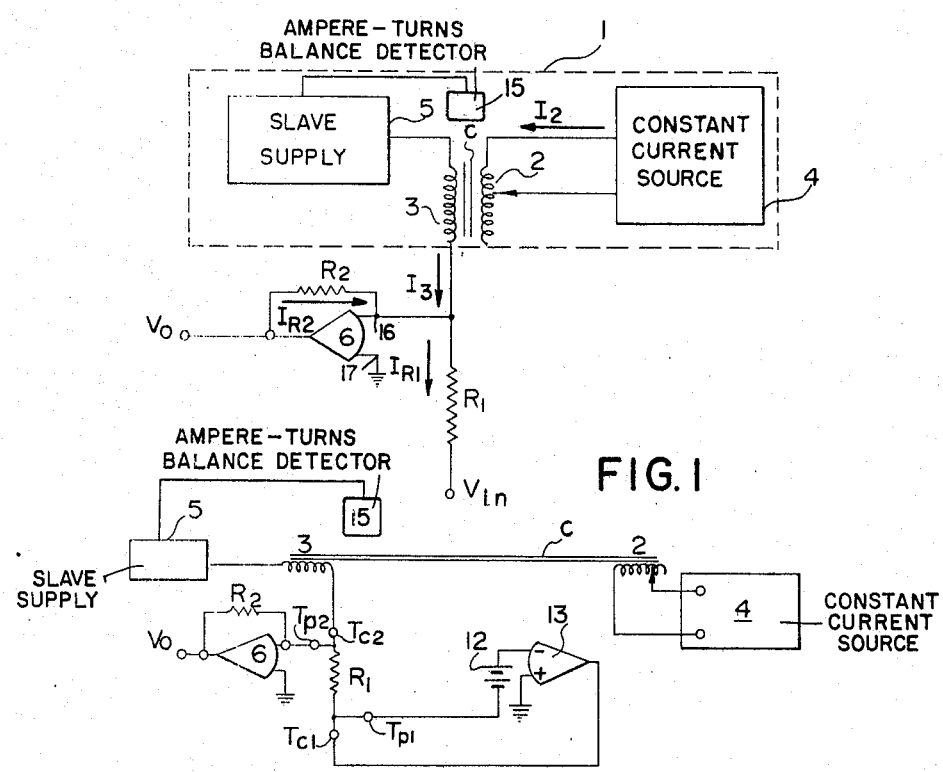
FIG. 1
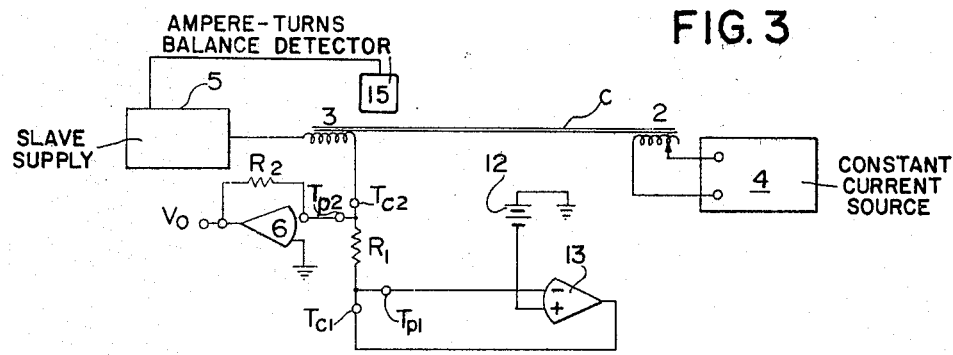
FIG. 3
FIG. 4
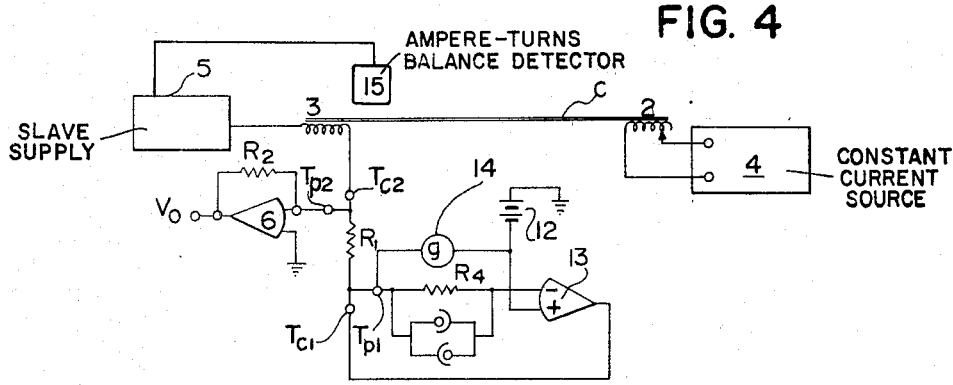
FIG. 5

AUTOMATIC BALANCING DC COMPARATOR VOLTMETER

This invention relates to a novel apparatus to measure the potential across a voltage source and in particular, to a novel apparatus which includes a direct current comparator and may be used as a voltmeter or potentiometer.

A potentiometer of the type in which a linearly varying current is passed through a constant resistance using a dc comparator is described in U.S. Pat. No. 3,500,171 issued on Mar. 10, 1970 to N. L. Kusters et al., assignees Canadian Patents and Development Limited. In this patent, the apparatus comprises a dc comparator with an adjustable turns ratio, a constant current supply connected to the primary winding, and a supply connected to the secondary winding which is controlled such that the net ampere-turns remain at zero. In addition a resistor is located in series with the secondary winding and supply such that a stepped series of precise voltages is generated across the resistor.

In the above current comparator potentiometer, the ampere-turns in the primary winding are equal to those in the secondary winding, i.e., net ampere-turns are zero. Also the current through the secondary winding and through the generating resistor are equal. However the voltage across the generating resistor and the measured device (as usually indicated by an external galvanometer), are not equal until made equal by the operator by adjusting turns.

The above apparatus is useful in providing a stepped series of precise, predetermined direct current values, however as a potentiometer it has a limited range of a few volts.

It is therefore an object of this invention to provide a novel voltmeter including a direct current comparator.

It is a further object of this invention to provide a direct current comparator voltmeter in which the turns ratios may be adjusted manually and which provides a relative reading of the measured voltage.

It is yet another object of this invention to provide a direct current comparator voltmeter in which the turns ratios may be adjusted automatically.

It is a further object of this invention to provide a potentiometer which presents an essentially infinite impedance to a voltage source that is measured.

It is another object of this invention to provide a voltmeter capable of reading high voltage, in the order of 150 and 1500 volts.

These and other objects are achieved by an apparatus for measuring a dc potential which comprises a self-balancing direct current comparator, a resistor and further detector means. The self-balancing direct current comparator includes a primary circuit having a primary winding with an adjustable number of turns $N_2$ wound on a magnetic core and current means to provide a constant current $I_2$ through the primary winding; a secondary circuit having a secondary winding with $N_3$ turns wound on the magnetic core and a slave current means to provide a direct current $I_3$ through said secondary winding; and means for detecting ampere-turns balance between the primary winding and the secondary winding, connected to the slave current means to maintain ampere-turns balance between the windings such that $I_2N_2 = I_3N_3$. The resistor has a first and second terminals means, with the second terminal means coupled to the secondary winding and the first terminal means adapted to be coupled to the dc potential to be measured to generate a current $I_{R1}$ in the resistor means. The further detector means is coupled to the second terminal means to generate a voltage $V_o$ when $I_3 \neq I_{R1}$ such that said dc potential to be measured is directly related to the turns $N_2$ when $V_o = 0$.

The further detector means may include an operational amplifier having a first input coupled to the resistor second terminal means and a second input coupled to ground, and a feedback resistor coupled between the amplifier's first input and its output terminal. Until $I_3 = I_{R1}$, current will flow through the feedback resistor and the operational amplifier will generate an output voltage $V_o$.

The output voltage $V_o$ may be used as an indication that the turns $N_2$ of the primary winding should be adjusted manually or alternately, $V_o$ may be used to drive a control circuit which adjusts the turns $N_2$ of the primary winding as well as a display.

In a further embodiment a second amplifier is used to drive current into the resistance, with the voltage source to be measured connected between the resistance and the amplifier input or between ground and the amplifier input.

In the drawings;

FIG. 1 is a schematic diagram of the invention;

FIG. 3 is a second input arrangement for the source to be measured;

FIG. 4 is a third input arrangement for the source to be measured; and

FIG. 5 is a fourth input arrangement for the source to be measured.

Figure 2:
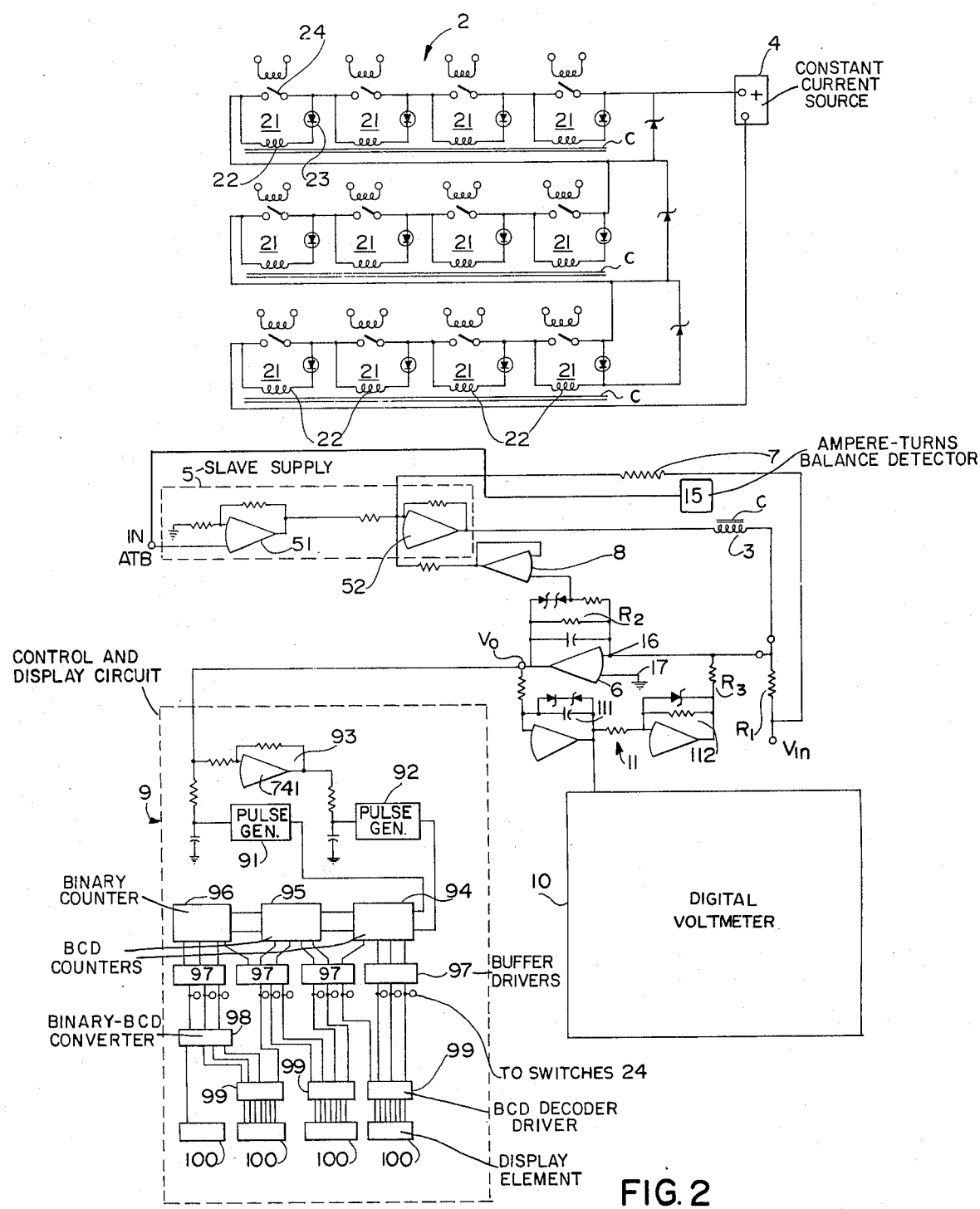
FIG. 2 is one embodiment of the automatic balancing voltmeter.

The apparatus for measuring dc potential in accordance with this invention is shown schematically in FIG. 1. It includes a self-balancing direct current comparator 1 which may be of the type described in the above mentioned U.S. Pat. No. 3,500,171. The direct current comparator includes a primary winding 2 and a secondary winding 3 wound on a magnetic core C. The primary winding is tapped such that any number of turns $N_2$ or fractions of a turn may be included in the primary circuit which is fed a constant current $I_2$ by a constant current source 4. The secondary winding 3 has $N_3$ turns and is fed by a slave current source 5 which provides the secondary winding 3 with a controlled current $I_3$ to maintain an ampere-turns balance between the windings at all times, i.e., such that $I_2N_2 = I_3N_3$. This condition exists when there is a zero flux in core C. An ampere-turns balance detector 15 controls the slave current source 5 such that proper current $I_3$ is provided in the secondary winding 3 to maintain ampere-turns balance for any variations in the turns $N_2$ in the primary winding 2.

The apparatus in accordance with this invention further includes a resistance $R_1$ Connected to one input 16 of an operational amplifier 6 which has a feedback resistance $R_2$. The second input 17 to the operational amplifier 6 is connected to ground. Finally the junction between resistance $R_1$ and the amplifier input 15 is connected to secondary winding 3.

In operation, the voltage to be measured is applied to resistance $R_1$ at terminal $V_{in}$ which generates a current $I_{R1}$ through $R_1$ in the direction shown by the arrow, this current is to be measured by the comparator 1. If the turns $N_2$ are zero in the primary winding 2, the detector 14 controls supply 5 to provide a current $I_3 = O$ so as to maintain ampere-turns balance, therefore no current flows through winding 3 and all the current through $R_1$ flows through the feedback resistance $R_2$ as shown by the arrow. The amplifier 6 generates a voltage $V_o$ at its output to keep the input 16 of the amplifier at zero volts relative to ground.

An operator or an automatic system, then adjusts the turns $N_2$ in the secondary winding 2 and the detector 15 controls the slave supply 5 to drive current through $N_3$. The turns $N_2$ are thus adjusted until $I_3$ becomes more nearly equal to the current $I_{R1}$ through $R_1$. The current $I_2$ through the feedback resistor $R_2$ of the amplifier 6 is therefore reduced, and the voltage at the output of the amplifier 6 reduced. If the turns $N_2$ are adjusted so that $I_3=I_{R1}$, the current $I_{R2}$ will be equal to zero and at the output of amplifier 6 will be zero, the value of the measured voltage $V_{in}$ will be:

$$V_{in} = R_1 \cdot N_2/N_3 \cdot I_2$$

where $I_2$ is the current provided to the primary circuit 2 by the constant current source 4.

If amplifier 6 current is not zero, its value must be included in the calculation of the value of $V_{in}$. By appropriate choice of values of the constant current $I_2$ $R_1$ and the value of the feedback resistor $R_2$, a direct readout of the value of $V_{in}$ may be obtained where the most significant digits are equal to the numbers of turns $N_2$ and the least significant digits are equal to the voltage at the output of amplifier 6.

Referring to FIG. 2, a preferred automated voltmeter is shown. The direct current comparator includes a primary winding 2 and a secondary winding 3 wound on a magnetic core C. The primary winding 2 includes a number of winding circuits 21 connected in series. Each circuit 21 consists of a winding 22 having a predetermined number of turns in series with a diode 23 across which is connected a switch 24. If a switch 24 is open, current $I_2$ from the constant current source 4 flows through the diode 23 and the windings 22. If any switch is closed the resistance of the switch is so much smaller than the resistance of the diode that leakage current through the winding is negligible. Thus the total number of turns $N_2$ in the primary will be controlled by switches 24. Though magnetic switches are shown, other devices may be used to switch windings into the primary circuit. The secondary winding 3 having $N_3$ turns is connected in series with the slave supply 5 which includes series connected amplifiers 51 and 52. Amplifier 51 receives a signal from the ampere-turn balance detector 14 and generates a current $I_3$ in the secondary winding to maintain ampere-turn balance i.e., $I_3N_3=I_2N_2$. In addition, amplifier 52 receives signals from tracking circuits 7 and 8 to be described later in greater detail.

The voltmeter further includes a series circuit consisting of a resistor $R_1$ and an operational amplifier 6 connected to the secondary winding 3 as described above with regard to FIG. 1. The voltage to be measured is connected to terminal Vin at one end of resistor $R_1$, and with no current flow through winding 3, all the current generated in $R_1$ flows through the amplifier 6 feedback resistor $R_2$. Amplifier 6 thus generates an output voltage $V_o$ to maintain the junction between $R_1$ and the input of amplifier 6 essentially at ground potential.

A fully automated voltmeter would further include control and display circuits generally shown as 9. In the control and display circuit 9, amplifier 6 output $V_o$ drives a first pulse generator 91 and a second pulse generator 92 through an inverter 93, if voltage $V_o$ is above a predetermined value at their input. The pulse generators are connected to a series of up-down counters 94, 95, 96 wherein 94 and 95 are BCD count and 96 is a binary counter. The counter outputs are fed to buffer/drivers 97 which are connected to switches 24 in the primary circuit 2. The appropriate switches 24 are therefore opened such that the number of turns in the primary circuit 2 is the same as the number stored in the counter.

As the number of turns in 2 increases, the automatic ampere-turn balancing circuit permits a current to flow in 3 to keep net ampere-turns near zero. As the current through $R_1$ is transferred from the feedback resistor $R_2$ to winding 3, the voltage at the output of amplifier 6 reduces, and eventually becomes smaller than that required to operate the pulse generator. The number of pulses stored in the counter, which is the same as the number of turns in 2, are then displayed in a decimal display, and are the most-significant digits in the bridge balance indication. The numbers shown are the same as would be indicated by the numbers of integral turns of winding 2 if they were set manually by an operator. The display consists of 7-segment display elements 100 which receive signals from the counters 94–96 through buffer/drivers 97, a binary-BCD converter 98 and BCD 7-segment decoder-driver 99 connected in the conventional manner.

Control and display circuit 9 thus controls the total number of integral turns in the primary circuit 2 as well as displays the most signficant digits of the voltage measured. To achieve this, the comparator primary winding may be built up with binary and BCD turns, so that the most significant digits are from zero to 1599.

The circuit generally shown as 11 consists of an integrator 111 (low frequency, high gain amplifier) and an inverting amplifier 112 supplying current to resistor $R_3$ having a very high impedance in the order of 5MΩ. Using this circuit, the output of the amplifier 6 is zero, at balance, and the small voltage $V_o$ which would normally exist at the output of amplifier 6 is transferred to the output of inverter 112. The advantage of this circuit is that the gain is higher and the integrator acts as a filter to remove ac which is present at the output of amplifier 6.

Block 10 represents a digital voltmeter whose output is displayed, decimally, in the same type of display as the most significant digits. The voltmeter 10 is connected to the output of integrator 111 and thus measures a voltage equivalent to the residual voltage which remained at the output of amplifier 6. If circuit 11 is not incorporated into the overall system, voltmeter 10 would be connected directly to the output of amplifier 6. Voltmeter 10 displays the same numbers as would have been displayed if fractional turns had been set manually by an operator.

Circuits 7 and 8 represent conventional tracking circuits which are connected to amplifier 52 in the secondary circuit. The amplifier 52 thus generates sufficient current to maintain ampere-turn balance in the comparator. Circuit 7 provides the main tracking while circuit 8 provides tracking correction. In this way, the ampere turns balance input to amplifier 51 is only required to maintain balance once achieved.

The direct current comparator voltmeter described above with regard to FIGS. 1 and 2 is suitable for measuring the voltage of a power supply or other voltage source from which current can be drawn, typically 1 or 1.5 mA at full voltage. It is also suitable for calibrating a digital voltmeter, by connecting both voltage measuring devices to the output of the same stable power supply.

To obtain accurate measurements, with a two terminal resistance $R_1$ in the above circuit the voltage to be measured or the power supply used in the calibration would generally have to be of a potential greater than 10 volts. If the voltage is small (<10V), a 4-terminal connection is recommended i.e., the resistance $R_1$ includes a current and a potential terminal at each end. The device whose voltage is to be measured is connected to the potential terminal and a suitable current or voltage supply is connected to the current terminal. The voltage between the potential terminals of $R_1$ is then equal to the voltage to be measured since the operational amplifier holds the second potential terminal of $R_1$ at ground potential.

FIGS. 3, 4 and 5 schematically show the comparator voltmeter of FIGS. 1 and 2 used as a potentiometer to measure the voltage of a standard cell or other source, while presenting an essentially infinite impedance to the measured device. In these figures, the second potential terminal $T_{p2}$ of $R_1$ is connected to amplifier 6 and the second current terminal $T_{c2}$ is connected to winding 3.

In FIG. 3, the standard cell 12 to be measured is isolated from ground in that it is connected between the first potential terminal $T_{p1}$ of $R_1$ and an operational amplifier 13 which supplies the current for resistor $R_1$ by means of its first current terminal. The second input of amplifier 13 is connected to ground. If the offset voltages between the inputs of the two operational amplifiers 6 and 13 are zero (or the same) the voltage between the two potential terminals ($T_{p1}$ and $T_{p2}$) of resistor $R_1$ is exactly the same as that across the standard cell 12 and the amplifier provides the current through resistor $R_1$.

The operation of the circuit of FIG. 4 is the same as that of FIG. 3, except that the standard cell 12 or other source is connected to ground, and the operational amplifier 13 which supplies the current to resistor $R_1$ through current terminals $T_{c1}$ has a common-mode voltage equal to the voltage of the measured device.

An improvement to FIG. 4 (which also could be used with FIG. 3) is shown in FIG. 5. A galvanometer 14 connected between the voltage to be measured and the potential terminal $T_{p1}$ of $R_1$ eliminates the error due to the offset voltage between the two input terminals of amplifier 13 by generating an equal voltage across a resistor $R_4$ in the lead between the potential terminal $T_{p1}$ of $R_1$ and the input terminal of amplifier 13.

We claim:

1. Apparatus for measuring a dc potential comprising:
   a. a self-balancing direct current comparator having a primary circuit, a secondary circuit, and means for detecting ampere-turns balance between the primary and secondary circuits; said primary circuit including a primary winding having an adjustable number of turns $N_2$ wound on a magnetic core and current means to provide a constant current $I_2$ through said primary winding, said secondary circuit including a secondary winding having $N_3$ turns wound on said magnetic core and current means controlled by said ampere-turns balance detector means to provide a direct current $I_3$ through said secondary winding to maintain ampereturns balance between said windings, such that $I_2 N_2 = I_3 N_3$;
   b. first resistor means having first and second terminal means, said second terminal means coupled to said secondary winding, said first terminal means adapted to be coupled to said dc potential to be measured to generate a current $I_{R1}$ in the resistor means; and
   c. further detector means coupled to said second terminal means to generate a voltage $V_o$ when $I_3 \neq I_{R1}$, such that said dc potential to be measured is directly related to the turns $N_2$ of said primary winding when the voltage $V_o = 0$.

2. Apparatus as claimed in claim 1 which further includes control means coupled to said further detector means and adapted to adjust the number of turns in said primary winding in response to the voltage $V_o$.

3. Apparatus as claimed in claim 2 in which said control means includes pulse generator means connected to said further means, up-down counter means connected to said pulse generator means, and means for adjusting said primary winding turns to the count stored in said counter means.

4. Apparatus as claimed in claim 2 which further includes display means adapted to display the count stored in said counter means.

5. Apparatus as claimed in claim 2 wherein said control means includes:
   first means adapted to adjust said primary winding an integral number of turns in response to the voltage $V_o$;
   second means adapted to determine a residual voltage from said further detector means which is representative of fractional turns.

6. Apparatus as claimed in claim 5 wherein said second means includes a digital voltmeter connected to the output of said further means.

7. Apparatus as claimed in claim 1 which further includes amplifier means, said potential to be measured connected between said first terminal of said first resistor and a first input terminal of said amplifier means, a second input of said amplifier means connected to ground, the output of said second amplifier connected to said first terminal of said first resistor.

8. Apparatus as claimed in claim 7 wherein said first terminal and second terminal means each comprise a potential terminal and a current terminal, the first potential terminal connected to said potential to be measured, the first current terminal connected to the amplifier output, the second current terminal connected to said secondary winding and said second potential terminal connected to said further means.

9. Apparatus as claimed in claim 1 which further includes amplifier means, said source to be measured connected between a first input to said amplifier and ground, a second input to said amplifier and said amplifier output connected to the second terminal of said first resistor.

10. Apparatus as claimed in claim 9 which further includes a further resistor connected between the second terminal of said first resistor and the second input to said second amplifier; and a galvanometer having first and second terminals, said first galvanometer terminal connected to the second terminal of said first resistor and said second galvanometer terminal connected to said source to be measured.

11. Apparatus as claimed in claim 9 wherein said first terminal means and said second terminal means each comprise a potential terminal and a current terminal, the first potential terminal connected to the first input of the amplifier, the first current terminal connected to the amplifer output, the second current terminal connected to the secondary winding and the second current terminal connected to the further means.

12. Apparatus as claimed in claim 1 wherein the dc potential to be measured $$V_{in} = R_1 \cdot N_2/N_3 \cdot I_2$$

when $V_o = 0$ where, $R_1$ is said first resistor, $N_2$ is the number of turns on the primary winding $N_3$ is the number of turns on the secondary winding and $I_2$ is the constant current through the primary winding.

13. Apparatus as claimed in claim 12 wherein the further means includes an operational amplifier having a feedback resistor connected between the amplifier output and a first amplifier input, said first input connected to said second terminal means, and a second amplifier input connected to ground.

* * * * *